INVENTORS
WILLIAM P. BANKS,
NORMAN L. CONGER &
BY  CARL E. LOCKE

William J. Miller
ATTORNEY

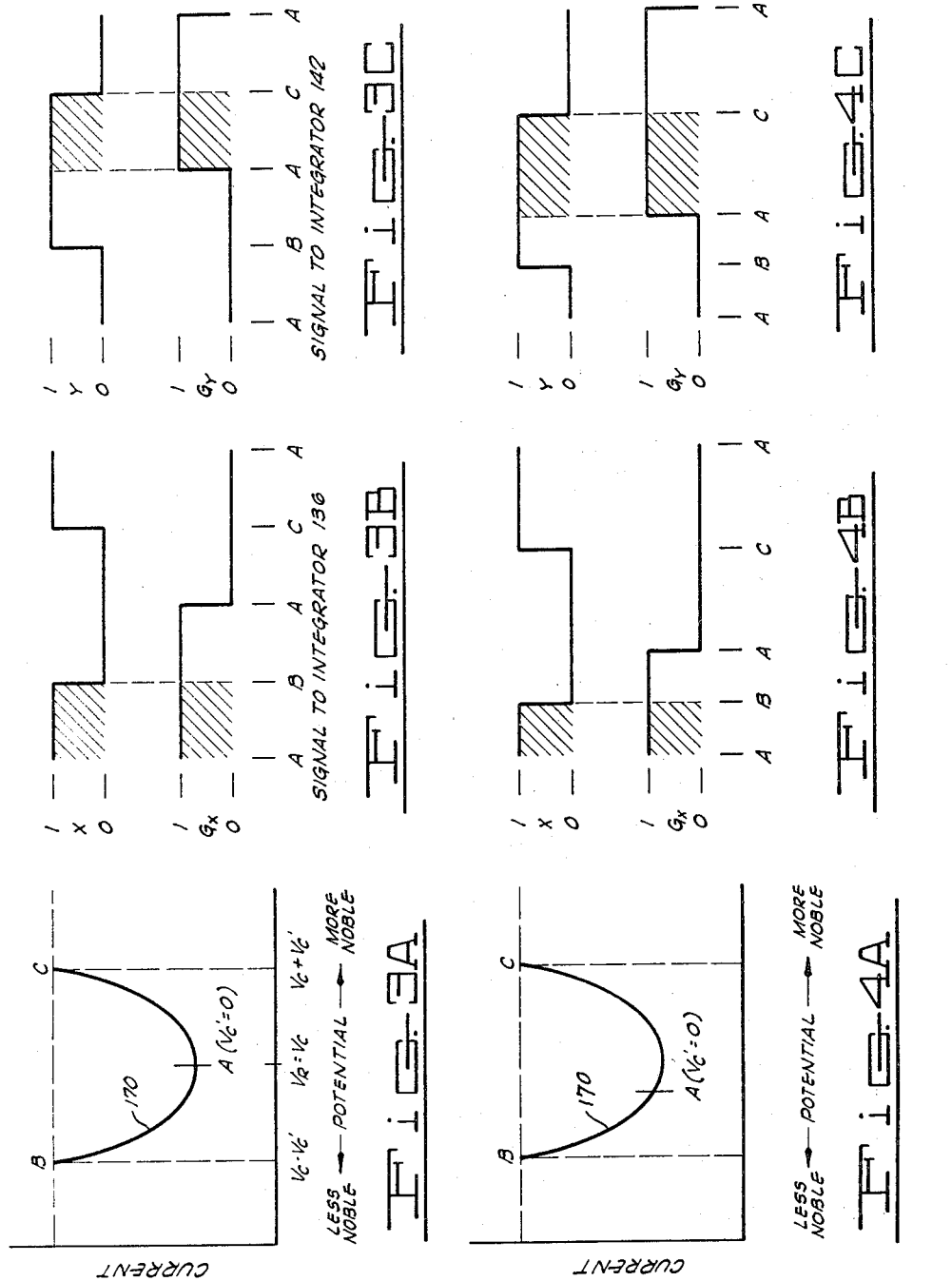

United States Patent Office 3,379,629
Patented Apr. 23, 1968

3,379,629
METHOD AND APPARATUS FOR AUTOMATICALLY CONTROLLING CORROSION OF PROCESS VESSELS
William P. Banks, Norman L. Conger, and Carl E. Locke, Ponca City, Okla., assignors to Continental Oil Company, Ponca City, Okla., a corporation of Delaware
Filed Feb. 8, 1965, Ser. No. 430,896
11 Claims. (Cl. 204—147)

As indicated, the present invention relates to an improved method and apparatus for automatically controlling corrosion of process vessels, and is particularly concerned with controlling the rate of corrosion of a process vessel wherein the passive potential of the vessel varies with time.

As it is well known in the art of corrosion control, the corrosion of many metals may be prevented or largely reduced by inducing passivity in the metal by anodic polarization techniques. Recently, a method and apparatus for corrosion prevention by means of anodic polarization has been developed wherein a metallic specimen, such as a vessel to be protected against corrosion by a chemical contained therein, is anodically polarized with respect to an inert electrode suspended in the corrosive electrolyte in the vessel. An electrical current is passed between the metallic vessel and the inert cathode in a manner such as to maintain the electrical potential of the vessel (with respect to a reference electrode, e.g. calomel) in a so-called passive region, that is, a potential range in which the rate of corrosion of the vessel is minimized. The magnitude of the current which is applied between the vessel and the inert cathode is at all times determined by the potential of the metallic vessel, with the current being varied as necessary in order to maintain the potential of the vessel in the region of passivity.

The electrical potential values at which the vessel is least susceptible to corrosion when subjected to contact with a particular electrolyte at a particular concentration and temperature may be determined by developing a polarization curve characteristic of the metal when the metal is in contact with the particular electrolyte at such temperature. The polarization curve is, of course, a curve in which the potential difference between the vessel and a reference electrode of constant potential is plotted against current density. The passive region on an anodic polarization curve can be easily identified and provides data indicative of the potential range within which the vessel should be maintained in order to achieve a maximum reduction in corrosion.

It has been determined that within the passive range of potentials the minimum corrosion occurs at the potential where current is a minimum. The current required to maintain potential within the passive range increases above and below the potential at which corrosion (and current) is a minimum. Therefore, if vessel potential is shifted into the passive range and the current maintained at a minimum value within the passive range, corrosion will be a minimum and electrical power consumed will be a minimum.

In the commercial systems which have been developed for protecting a metallic member by anodic polarization procedures, a reference electrode of constant potential is placed in electrical communication with the corrosive electrolyte contacting the metallic member, and the potential difference between such reference electrode and the metallic member is constantly monitored. This potential difference, which may be termed the reference potential, $V_r$, is constantly compared electrically with a second potential called the control potential, $V_c$. The control potential $V_c$ is the potential difference which, according to polarization curve data, must exist between the metallic member and the reference electrode if the vessel is to be maintained in a passive state. The continuous electrical comparison of the reference potential $V_r$ with the control potential $V_c$ results in the continuous generation of an error voltage $V_e$ which provides a signal usable to increase or decrease the amount of current passed between the metallic member and the inert cathode suspended in the electrolyte. In other words, the reference potential $V_r$ is constantly monitored, and the anodic corrosion control system functions to develop an error signal in the manner described to constantly maintain the metallic member at a passive potential.

In anodic polarization control systems of the type described, no difficulty is generally encountered in the proper functioning of the system as long as the control potential $V_c$ which must be set into the system for comparison with the reference potential $V_r$ is of a relatively constant value. This will generally be the case where the corrosion control system is to be used in protecting a metallic vessel against corrosive attack by a single type of electrolyte at a fairly constant concentration and at a fairly constant temperature. However, where the passive potential range of the vessel changes with time, as where the corrosive electrolyte is replaced by another, or where the temperature of the electrolyte is varied substantially, or its concentration changed sharply, it is then necessary to introduce a different control potential $V_c$ into the system so that the reference potential $V_r$ may be compared to such different control potential and brought into correspondence with it by the system through the passage of anodic current of different magnitude between the vessel and the inert cathode.

It would be possible to manually set the new control potential into the passivation system by manual adjustment of a potentiometer or the like, when a change in the system under protection requires a different control potential. Such procedure is, of course, time consuming and requires the attention of operating personnel.

The present invention proposes a technique whereby the potential of a vessel is shifted to a point in the passive range of potentials. Once passivity is attained at the minimum corrosion and minimum current potential, the system will initiate a cyclic perturbation in the control potential to cause the vessel potential to cycle more noble and less noble about this minimum current-corrosion potential. By comparing the time required to reach a predetermined current level on each side of the current minimum, an error signal is developed which is used to readjust the main potential control voltage for operation at the minimum current-corrosion potential.

Broadly speaking, the present invention may be defined as a method of maintaining the passivity of a metallic vessel containing a corrosive, electrolytic solution wherein the potential of the vessel at which the minimum rate of the corrosion occurs changes with time, comprising placing an inert electrode in the solution; imposing a potential across the electrode and the vessel; sensing the rate of current flow between the vessel and the electrode; increasing the potential between the vessel and the electrode until the rate of current flow through the solution between the vessel and the electrode reaches a predetermined maximum, and, alternately, decreasing the potential between the vessel and the electrode until the rate of current flow through the solution between the vessel and the electrode again reaches said predetermined maximum, whereby the potential of the vessel will vary in accordance with variations in the passive potential of the vessel and the potential of the vessel will be maintained in a range of minimum corrosion.

More specifically, the present invention may be defined as a system for maintaining the passivity of a metallic vessel containing a corrosive, electrolytic solution wherein the potential of the vessel at which the rate of corrosion of the vessel is at a minimum changes with time, comprising an inert electrode supported in the solution; a reference electrode electrochemically communicating with the solution, and control means connected to the reference electrode and the vessel for producing an error voltage. The control means includes a first adjustable means for bucking the difference in potential between the vessel and the reference electrode and being adapted to be set at the passive potential of the vessel at the beginning of the passivation operation, and a second adjustable means connected in series with the first adjustable means having a zero position and being adapted to produce a secondary control voltage alternately swinging more noble and less noble than the potential set in the first adjustable means. A variable DC power supply is connected to be controlled by the control means to apply an increasing potential across the inert electrode and the vessel when the output voltage of the control means increases and to apply a decreasing potential across the inert electrode and the vessel when such output voltage decreases. Means are provided for sensing the rate of current flow through the solution between the vessel and the inert electrode cooperating with means for adjusting said second adjustable means to change the secondary control voltage to a more noble value than that set in the first adjustable means until the current flow through the solution between the vessel and the inert electrode reaches a predetermined maximum, and, alternately, adjusting said second adjustable means to change the secondary control voltage to a less noble value than that set in the first adjustable means until the current flow through the solution between the vessel and the inert electrode again reaches said predetermined maximum. Means are provided for comparing the time it takes said second adjustable means to reach a predetermined current maximum on the more noble side of its zero position with the time it takes said second adjustable means to reach a predetermined current maximum on the less noble side of its zero position and for producing an output signal related to said comparison. Finally, means responsive to said output signal are provided for adjusting said first adjustable means, whereby the voltage set in said first adjustable means tracks the variations in the passive potential of the vessel at which corrosion and current are a minimum.

An object of this invention is to minimize the corrosion of a metallic vessel containing a corrosive electrolytic solution wherein the passive potential of the vessel varies with time.

Another object of this invention is to provide a system for passivating a metallic process vessel wherein the potential of the vessel is maintained in a passive range, regardless of changes in the environment of the vessel.

Another object of this invention is to minimize the power required to maintain a metallic vessel passive when the passive potential of the vessel changes with time.

A further object of this invention is to provide a system for automatically maintaining a vessel at the potential corresponding to minimum corrosion where this potential varies over wide limits due to changes in concentration, temperature, etc.

A still further object of this invention is to provide a system for passivating a metallic vessel wherein the passive potential range of the vessel varies with time, without the necessity of manual adjustment of the system.

Another object of this invention is to provide a system for maintaining passivity in a metallic vessel which is simple in construction, utilizes readily available equipment and which has a long service life.

Other objects and advantages of the invention will be evident from the following detailed description, when read in conjunction with accompanying drawings which illustrate the invention.

In the drawings:

FIG. 3A is a schematic illustration of the variation in current flow from a vessel to an inert electrode in the vessel when the control potential of the system corresponds to the reference potential of the vessel.

FIG. 3B is an illustration of the time relation of the signals fed to one of the integrators of the passivation system when the current flow through the solution in the vessel corresponds to the illustration in FIG. 3A.

FIG. 3C is an illustration of the time relation of the signals fed to the other integrator of the system when the current flow through the solution in the vessel being protected is as illustrated in FIG. 3A.

FIG. 4A is an illustration of the current flow through the solution in a vessel being protected when the control potential does not correspond with the reference potential.

FIG. 4B is an illustration similar to FIG. 3B varied for the current flow illustrated in FIG. 4A.

FIG. 4C is an illustration similar to FIG. 3C varied for the current flow illustrated in FIG. 4A.

Figure 1:
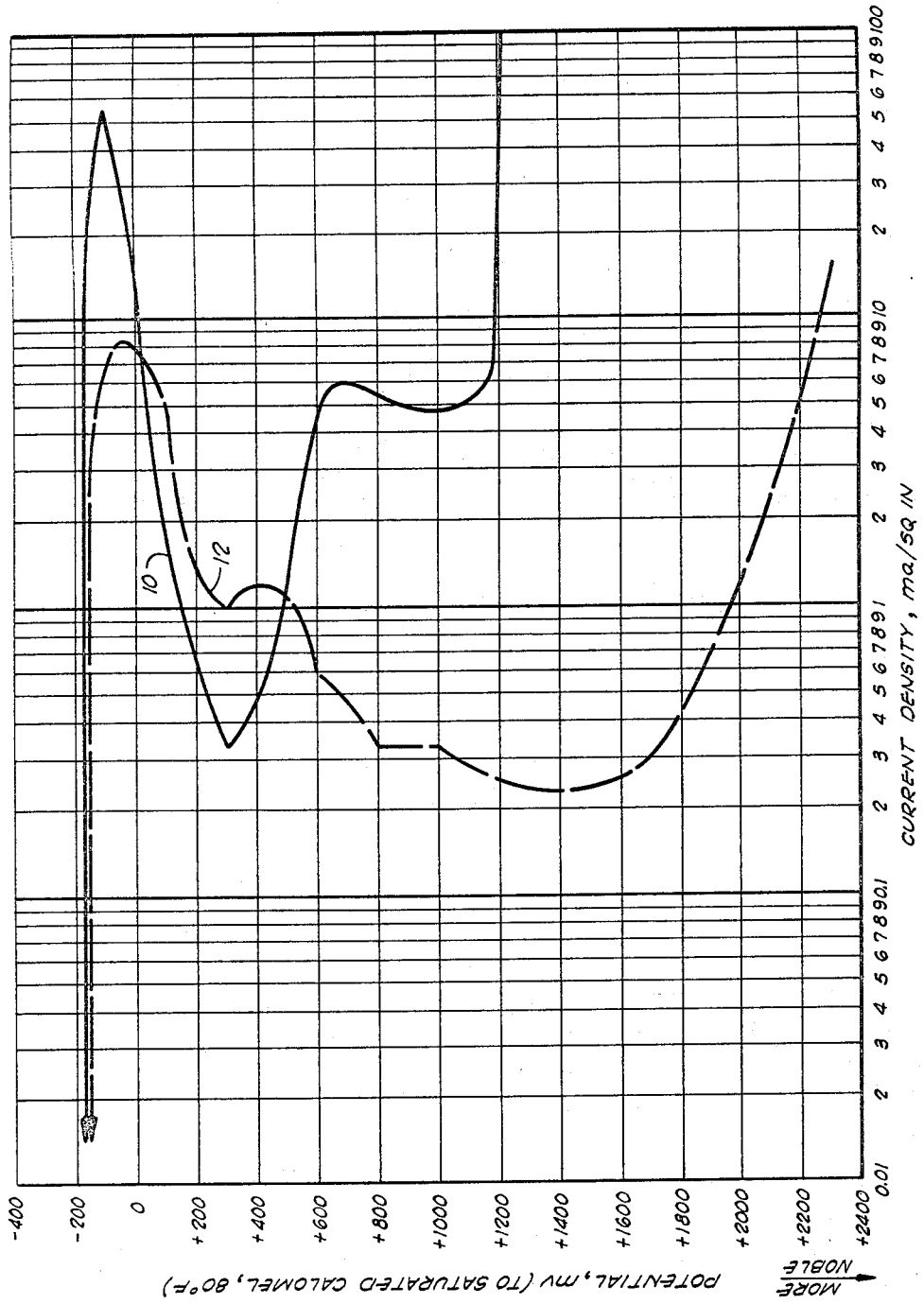
FIG. 1 is an illustration of the change in the anodic polarization curve, and hence the passive range, of a metallic vessel containing a solution of reactants undergoing reaction.

Referring to the drawings in detail, and particularly FIG. 1, reference character 10 designates the anodic polarization curve for a specimen of 316L stainless steel emersed in a solution comprising 60 percent $H_2SO_4$, 16 percent $H_2O$, and 24 percent organic solvent and reactants at 235° F. which corresponds to the start of an organic chemical reaction. On the other hand, the curve 12 is the anodic polarization curve for the same stainless steel specimen at the conclusion of the organic reaction with the solution at 265° F. The polarization curves 10 and 12 were obtained in the manner previously described, such that each polarization curve indicates the variations in current flow through the particular solution from the vessel to an inert cathode suspended in the solution at the various potentials indicated, said potentials being measured between the vessel and a saturated calomel reference electrode at 80° F.

An examination of FIG. 1 clearly shows that the potential of the stainless steel specimen at which a minimum anodic current was required varied substantially during the reaction. The optimum passive potential varied, in the particular case illustrated, from approximately +300 mv. to approximately +1400 mv. It will also be noted that the minimum anodic current density required to maintain the maximum passivation varied from approximately 0.35 ma./square inch to 0.25 ma./square inch. However, as a practical matter, retention of the current density to not more than 0.40 ma./square inch, would provide sufficient passivity of the vessel and would sufficiently minimize the power required to passivate the vessel. Each of the polarization curves 10 and 12 has a portion extending below 0.40 ma./square inch. Thus, if the anodic current were maintained anywhere below 0.40 ma./square inch throughout the reaction, the vessel would, as a practical matter, be passivated and a minimum power would be required for such passivation. On the other hand, however, it will be noted that the reference potential, and hence the control potential of the passivation system, would need to be shifted over a substantial range in order to maintain passivity.

Figure 2:
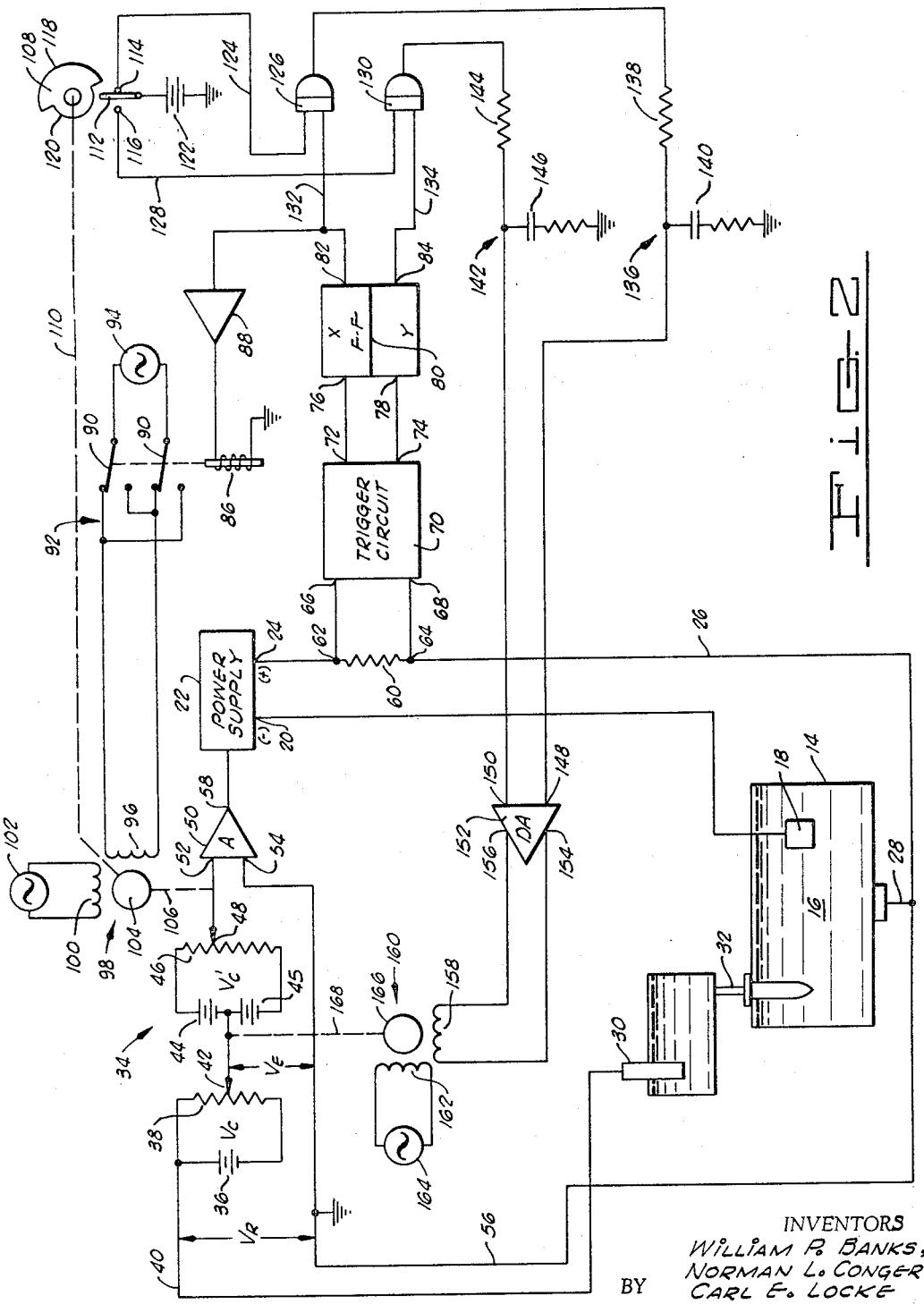
FIG. 2 is a schematic wiring diagram of a passivation system constructed in accordance with this invention.

A preferred embodiment of the present passivation system is illustrated in FIG. 2. Reference character 14 designates a metallic vessel containing a corrosive electrolyte solution 16. For example, the vessel 14 might be a stainless steel process vessel containing a solution 16 of 60 percent $H_2SO_4$, 16 percent $H_2O$ and 24 percent organic solvent and reactants at an elevated temperature. The vessel 14 would then have an anodic polarization curve as illustrated in FIG. 1 and previously described, depending upon the state of the reaction of the organic reactants. The purpose of the present system is, of course, to minimize corrosion of the vessel 14 through the reaction.

An inert electrode 18 is suitably supported in the solution 16 and is connected to the negative output terminal 20 of a suitable DC power supply 22. The positive output terminal 24 of the power supply 22 is connected by a suitable conductor 26 and a conductor 28 of the vessel 14. The inert electrode 18 may be constructed of any material which is inert to the electrolyte 16 and resists changes in potential as the current is passed therethrough, that is, a material which does not polarize. In most instances, platinum is a suitable material of construction. It should also be noted at this point that the power supply 22 is connected to the vessel 14 and the inert electrode 18 in such a direction that the vessel 14 is made the anode and the electrode 18 is made the cathode.

In order to be constantly apprised of the potential of the vessel 14, a reference electrode 30 of constant electrical potential is placed in electrochemical communication with the corrosive solution 16, and the potential difference (hereinafter termed the reference potential, $V_r$) between the reference electrode and the vessel is continuously monitored. A standard calomel half cell may be suitably used as the reference electrode 30, and when employed, is placed in electrical communication with the corrosive electrolyte by a suitable salt bridge 32 as is well understood in the art.

In order to monitor and control the potential of the vessel 14, a potential controller generally designated by reference character 34 is connected between the reference electrode 30 and the vessel 14. The controller 34 comprises a first battery 36 having a potentiometer 38 connected across the positive and negative terminals thereof. The positive terminal of the battery 36 is also connected to the reference electrode 30 by a conductor 40. It will thus be seen that the voltage imposed on the contactor 42 of the potentiometer 38 will depend upon the relative position of the contactor on the coil 38. The battery 36 is used to buck or oppose the reference potential $V_r$, and the position of the contactor 42 on the coil 38 will determine the amount of the voltage of the battery 36 (the primary control potential, $V_c$) which is used to oppose the reference potential. When the controller 34 is properly set at the beginning of a passivation operation, the voltage on the contactor 42 (the voltage normally known as the error voltage $V_E$) is at a predetermined value, such as zero.

The controller 34 also includes a pair of batteries 44 and 45 connected in series with the junction between these batteries connected to the contactor 42. A second potentiometer 46 is connected across the terminals of the batteries 44 and 45 and a contactor 48 is in sliding contact with the potentiometer 46. The batteries 44 and 45 produce what is sometimes called herein a secondary control potential $V_c'$. It will thus be seen that the voltage imposed on the contactor 48 will be equal to $(V_c \pm V_c') - V_r$. Thus, the contactor 48 would be near zero volts at the beginning of a passivation operation when positioned in the center of the potentiometer 46 and would be equal to $V_E$. On the other hand, the voltage on the contactor 48 may be made more noble than and less noble than the primary control potential $V_c$ by moving the contactor in opposite directions across the potentiometer 46. The mechanism used for moving or swinging the contactor 48 will be described below.

The controller 34 further includes a suitable amplifier 50 having two input terminals 52 and 54. One input terminal 52 is connected to the contactor 48 and the other input 54 is connected to ground and to the vessel 14 by a conductor 56. The voltage applied to the inputs 52 and 54 is thus the potential between the contactor 48 and ground, and is sometimes herein referred to as the output voltage of the controller 34, although the amplifier 50 functions to amplify the potential on the contactor 48 and produce a higher voltage at the output 58 thereof for controlling the action of the power supply 22. It will be understood that the power supply 22 may be of any suitable construction which is responsive to a varying control voltage applied thereto for varying the voltage imposed on the output terminals 20 and 24 of the power supply, and hence the amount of current passed through the solution 16 between the vessel 14 and the electrode 18. For example, the power supply 22 may include a saturable core reactor having its control winding connected to the output terminal 58 of the amplifier 50 for effectively controlling the operation of the power supply.

A current sensing resistor 60 is interposed in the conductor 26 extending between the output terminal 24 of the power supply 22 and the vessel 14 to sense the amount of current being supplied to the vessel 14 and thus the amount of current being passed through the solution 16 from the vessel 14 to the electrode 18. The terminals 62 and 64 of the resistor 60 are connected to the input terminals 66 and 68 of a trigger circuit 70, such as a Schmidt trigger. The trigger circuit 70 is constructed to conduct at its output terminals 72 and 74 when the current sensed by the resistor 60 reaches a predetermined maximum value. For example, the trigger circuit 70 may be constructed to fire and thus conduct at its output terminals 72 and 74 when the current sensed by the resistor 60 reaches a value which would provide a current density of 0.40 ma./square inch of the interior surface of the vessel 14 when the vessel 14 has an anodic polarization curve as shown in FIG. 1.

The output terminals 72 and 74 of the trigger circuit 70 are connected to the input terminals 76 and 78 of a flip-flop circuit 80 having two sections designated X and Y in the drawing. The flip-flop circuit 80 is constructed to have two output terminals 82 and 84 and operates in such a manner that every odd time the trigger circuit 70 fires an output signal will be provided on the output 82 of the flip-flop circuit and every even time the trigger circuit 70 fires there is an output signal at the output 84 of the flip-flop circuit. Thus, a signal will appear at either the output 82 or the output 84 of the flip-flop circuit 80 at all times. In other words, when the sensing resistor 60 senses the predetermined maximum current one time, the output terminal 82 of the flip-flop circuit 80 will be "on" and the output terminal 84 will be "off," and the next time the resistor 60 senses the predetermined maximum current, the output terminal 84 will be switched "on" and the terminal 82 will be switched "off."

One of the output terminals of the flip-flop circuit 80, such as the terminal 82, is connected to a suitable relay 86 through an amplifier 88 to energize the relay 86 each time the respective output terminal 82 comes "on." The armature of the relay 86 is suitably connected to the switch arms 90 of a reversing switch 92, such that the switch 92 will be in one position when the relay coil 86 is energized and will be in a reversed position when the relay 86 is de-energized. The input to the reversing switch 92 is provided by a suitable AC source 94, and the output of the reversing switch is supplied to the control winding 96 of a servo motor 98. The reference winding 100 of the servo motor 98 is supplied with a reference AC from a suitable source 102. As is well known in the art, when the signal applied to the control winding 96 is in phase with the signal applied to the reference winding 100, the shaft 104 of the servo motor 98 will turn in one direction, and when the current applied to the control winding 96 is out of phase with the current applied to the reference winding 100 the shaft 104 will turn in the opposite direction.

As indicated by the dash line 106, the shaft 104 of the servo motor 98 is mechanically connected to the contactor 48 of the controller 34 to vary the output of the controller 34 as the shaft 104 is turned in opposite directions. Thus, when the flip-flop output terminal 82 is "on," $V_c'$ may, for example, become more noble than $V_c$, and when the terminal 82 is "off," $V_c'$ may become less noble than $V_c$.

The shaft 104 of the servo motor 98 is also mechanically connected to a cam 108 as shown by the dash line 110 in FIG. 2. The cam 108 is provided to operate a switch blade 112 between contacts 114 and 116. In this connection it will be noted that the cam 108 has a large radius 118 extending through one-half of the periphery of the cam and a shorter radius 120 extending through the remaining half of its periphery. The cam is arranged with respect to the switch blade 112 in such a position that when the switch blade 112 is opposite the smaller radius 120 of the cam 108 the switch blade will be in contact with the contact 114, and when the cam 108 is turned to a point where the larger radius 118 of the cam is opposite the switch blade 112, the switch blade will be moved into contact with the contact 116. It should also be pointed out here that the cam 108 is arranged on the servo motor shaft 104 in such a position that the switch blade 112 will be moved from the contact 114 to the contact 116 (or vice versa) when the contactor 48 of the controller 34 passes the neutral point of the potentiometer 46. Thus, current from a suitable direct current source, such as a battery 122, connected to the switch blade 112 will be switched from the contact 114 to the contact 116, or vice versa, as the contactor 48 passes the neutral portion of the potentiometer 46. This operation will be explained more in detail later under the heading operation.

The contact 114 associated with the switch blade 112 and the battery 122 is connected by a suitable conductor 124 to one input of an AND gate 126. The opposite contact 116 is connected by a suitable conductor 128 to one input of another AND gate 130. The second input of the AND gate 126 is connected by a conductor 132 to the output terminal 82 of the flip-flop circuit 80, and the other input of the AND gate 130 is connected to the other output terminal 84 of the flip-flop circuit by a suitable conductor 134. It will thus be apparent that in order for the AND gate 126 to conduct, the output terminal 82 of the flip-flop circuit must be "on" and the contact 114 must be in communication with the battery 122 through the switch blade 112. On the other hand, the AND gate 130 does not conduct unless the output terminal 84 of the flip-flop circuit is "on" and the switch blade 112 is in contact with the contact 116. The operation of each AND gate will be explained more in detail in connection with FIGS. 3 and 4.

The output from the AND gate 126 is transmitted to an integrator 136 comprising a resistor 138 and compacitor 140 to integrate the gated signals passing through the AND gate 126. The output of the AND gate 130 is transmitted to another integrator 142 comprising a resistor 144 and compacitor 146 to integrate the signals gated through the AND gate 130.

The integrated signals from the integrators 136 and 142 are transmitted to the inputs 148 and 150 of a differential amplifier 152. The outputs 154 and 156 of the differential amplifier 152 are in turn connected to the control winding 158 of another servo motor 160. The reference winding 162 of the servo motor 160 is energized by a suitable AC source 164. It will thus be seen that when the signal fed to the input 150 of the differential amplifier 152 exceeds the signal being applied to the input 148, the shaft 166 of the servo motor 160 will be turned in one direction, and when the opposite situation exists, the shaft 166 will be turned in the opposite direction. The shaft 166 is mechanically connected, as indicated by the dash line 168, to the contactor 42 in the controller 34. Thus, the servo motor 160 determines the position of the contactor 42 on the potentiometer 38 and thus determines $V_c$ which bucks the reference voltage $V_r$.

Operation

The operation of the present system is best explained with reference to FIGS. 3 and 4 in conjunction with FIG. 2. Referring first to FIG. 3A, the line B–C designates the level of anodic current passing through the solution 16 between the vessel 14 and the electrode 18 which is sufficiently high to fire the trigger circuit 70 and switch the flip-flop circuit 80. The curve 170 illustrates the variation in the anodic current passing through the solution 16 upon swinging of the contactor 48 in the controller 34 to vary the potential applied by the power supply 22 on the vessel 14 and the electrode 18. Thus, when the contactor 48 in the controller 34 has been moved sufficiently in one direction to cause the level of the anodic current to reach the current threshold line B–C, the flip-flop circuit 80 is switched and the contactor 48 is then moved in an opposite direction across the potentiometer 46 until the level of the anodic current again reaches the threshold level B–C. Position A on the curve 170 in FIG. 3A indicates the zero position of the contactor 48. Point B denotes a potential less noble than point A, while point C denotes a potential more noble than point A. At point A on the curve 170, the vessel 14 would be passivated at the minimum anodic current.

In FIG. 3B, the signal X is to designate the output of the X section of the flip-flop circuit 80, and thus the output of the flip-flop circuit appearing at output terminal 82. Assuming that the X output is at "1" as the contactor 48 moves past zero toward a position to produce point B in FIG. 3A, the flip-flop circuit 80 would switch states at B and the X signal would drop to "0." As the contactor 48 was then moved in the opposite direction across the potentiometer 46 to lower and then again raise the anodic current level to the threshold level, the flip-flop circuit 80 would again switch states at point C in FIG. 3A to again provide a "1" output from the X section of the flip-flop circuit.

The signal $G_x$ in FIG. 3B is to designate the signal appearing at contact 114 (FIG. 2) during one cycle of operation of the contactor 48. It will be observed that the signal $G_x$ is "1" as the contactor 48 passes through the zero position to raise the anodic current level to point B and remains "1" until the contactor again returns to the zero position at point A in the curve of FIG. 3A. At this time, the signal $G_x$ will go "0" and remain zero as the anodic current is raised to point C and back down to point A in the curve of FIG. 3A; whereupon, the signal $G_x$ would again go "1." It will be recalled that the cam 108 switches the position of the switch blade 112 each time the contactor 48 goes through its zero position with respect to the potentiometer 46. It will thus be seen from an examination of 3B that the AND gate 126 will function to transmit to the corresponding integrator 136 only the shaded portions of the signals X and $G_x$ which will be equal to exactly one-quarter of a complete cycle of movement of the contactor 48.

Referring to FIG. 3C, it will be observed that the Y signal is to indicate the output of the Y section of the flip-flop circuit 80 appearing at the output terminal 84. Following the previous discussion, it will be apparent that the Y signal goes to "1" as the contactor reaches a point on the potentiometer 48 which provides the anodic current level at point B and the Y signal then remains at "1" until the current level returns back up to point C. The signal $G_y$ in FIG. 3C is to designate the signal appearing at contact 116 of the system shown in FIG. 2 and thus the signal applied to the other input of the AND gate 130. The signal $G_y$ goes to "1" as the contactor 48 passes through its zero position to raise the anodic current level to point C, since the enlarged radius 118 of the cam 108 will then be in contact with the switch blade 112. The signal $G_y$ will remain at "1" until the contactor 48 passes back through its zero position as indicated at point A on the curve of FIG. 3A. It will thus be apparent from an examination of FIG. 3C that the AND gate 130 will pass the portions of the signals Y and $G_y$ which are shaded, since no signals can pass through the AND gate unless both of the signals Y and $G_y$ are "1."

An examination of both FIGS. 3B and 3C shows that identical signals are fed to the integrators 136 and 142, such that the differential amplifier 152 will not be operated, and the shaft 166 of the servo motor 160 will remain in a fixed position to in turn retain the contactor 42 of the controller 34 in a fixed position. With the contactor 42 in this position, the secondary, cyclic control potential $V_c'$ will swing more and less noble about $V_c$ in equal amounts to vary the anodic current as shown by the curve 170 in FIG. 3A. As previously indicated, a minimum of power is required to maintain the vessel in this passive state.

Let it now be assumed that the potential for minimum anodic current shifts in a less noble direction with respect to the control voltage $V_c$ as illustrated in FIG. 4A. In the example previously described such a shift would occur as the reaction of the electrolytic solution 16 proceeds. An examination of the controller 34 shown in FIG. 2 will then reveal that the zero position of the contactor 48 (the position of the contactor 48 at which $V_c'$ equals zero) no longer corresponds to the potential at which the anodic current is a minimum. Thus, the cyclic, secondary control voltage $V_c'$ no longer swings more and less noble about $V_c$ in equal amounts. In other words, the zero position of $V_c'$ is much closer to the predetermined current maximum corresponding to the potential at point B in FIG. 4A than to the current maximum corresponding to the potential at point C.

As shown in FIGS. 4B and 4C, the signal $G_y$ will stay at "1" much longer than the signal $G_x$ when point A shifts toward point B. Here again, the shaded portions of the signals X and $G_x$ are transmitted through the AND gate 126 to the integrator 136, and the shaded portions of the signals Y and $G_y$ are transmitted through the AND gate 130 to the integrator 142. Therefore, the total signal applied to the integrator 142 is substantially more than the total signal applied to the integrator 136, to energize the differential amplifier 152. The phase of the current fed from the differential amplifier 152 through the control winding 158 is therefore shifted with respect to the phase of the source 164 to alter the position of the shaft 166 of the servo motor 160, and thus the position of the contactor 42 in the controller 34. The resulting repositioning of the contactor 42 resets the set potential $V_c$ in the controller to the new potential at which current is a minimum; whereupon the operating conditions illustrated in FIGS. 3A, 3B and 3C will then again prevail until a further shift in the minimum current potential occurs.

From the foregoing it will be apparent that the present invention provides a novel method and apparatus for maintaining a metallic vessel passive which is particularly adapted for use when the passive potential of the vessel changes with time. The system effectively tracks changes in the passive potential of the vessel at which corrosion and current are a minimum and varies the potentials applied to the vessel and the inert electrode accordingly. The system requires the use of a minimum of power for maintaining passivity in a metallic vessel subject to changes in its passive potential. It will also be apparent that the present system is simple in construction, utilizes only readily available equipment and may be economically manufactured.

Changes may be made in the combination and arrangement of parts or elements as well as steps and procedures heretofore set forth in the specification and shown in the drawings without departing from the spirit and scope of the invention as defined in the following claims:

What is claimed is:

1. In a method of maintaining passivity in a metallic vessel containing a corrosive, electrolytic solution wherein the potential of the vessel at which the minimum rate of corrosion occurs changes with time, comprising:
   placing an inert electrode in the solution;
   imposing a potential across the inert electrode as the cathode and the vessel as the anode;
   sensing the rate of current flow between the vessel and the electrode;
   increasing the potential between the vessel and the electrode until the rate of current flow through the solution between the vessel and the electrode reaches a predetermined maximum, and, alternately, decreasing the potential between the vessel and the electrode until the rate of current flow through the solution between the vessel and the electrode again reaches said predetermined maximum, whereby the potential of the vessel will be maintained in a range of minimum corrosion.

2. In a method of maintaining passivity in a metallic vessel containing a corrosive, electrolytic solution wherein the potential of the vessel at which the minimum rate of corrosion occurs changes with time, comprising:
   placing an inert electrode in the solution;
   imposing a potential across the inert electrode as the cathode and the vessel as the anode;
   sensing the current flow through the solution between the vessel and the inert electrode;
   placing a reference electrode in electrochemical communication with the solution;
   monitoring the difference in potential between the reference electrode and the vessel;
   varying the potential between the vessel and the inert electrode in a direction to shift the potential difference between the reference electrode and the vessel in a more noble direction until the flow of current through the solution between the vessel and the inert electrode reaches a predetermined value, then, alternately, varying the potential between the vessel and the inert electrode in a direction to shift the potential difference between the vessel and the reference electrode in a less noble direction until the flow of current through the solution between the vessel and the inert electrode again reaches said predetermined value, whereby the potential of the vessel is maintained in a range of minimum corrosion.

3. A system for passivating a metallic vessel containing a corrosive, electrolytic solution wherein the potential of the vessel at which the minimum rate of corrosion occurs changes with time, comprising:
   an inert electrode supported in the solution;
   power means for imposing a variable potential across the vessel as the anode and the inert electrode as the cathode;
   means for sensing the rate of current flow through the solution between the vessel and the inert electrode; and
   means for controlling the power means for increasing the potential between the vessel and the inert electrode until the rate of current flow through the solution between the vessel and the inert electrode reaches a predetermined maximum, and, alternately, controlling the power means for decreasing the potential between the vessel and the inert electrode until the rate of current flow through the solution between the vessel and the inert electrode again reaches said predetermined maximum, whereby the potential of the vessel will be maintained in a range of minimum corrosion.

4. A system for passivating a metallic vessel containing a corrosive, electrolytic solution wherein the potential of the vessel at which the minimum rate of corrosion occurs changes with time, comprising:
   an inert electrode supported in the solution;
   power means for imposing a variable potential across the vessel as the anode and the inert electrode as the cathode;
   means for sensing the current flow through the solution between the vessel and the inert electrode;
   a reference electrode electrochemically communicating with the solution;
   control means connected to the vessel, the reference electrode and said power means for controlling said power means to impose a potential across the vessel and the inert electrode varying in one direction to shift the potential difference between the reference electrode and the vessel in a more noble direction until the flow of current through the solution between the vessel and the inert electrode reaches a predetermined maximum, then, alternately, imposing a potential across the vessel and the inert electrode varying in the opposite direction to shift the potential difference between the vessel and the reference electrode in a less noble direction until the flow of current through the solution between the vessel and the inert electrode again reaches said predetermined maximum, whereby the potential of the vessel is maintained in a range of potential which produces a minimum of corrosion.

5. A system for passivating a metallic vessel containing a corrosive, electrolytic solution of reactants wherein the potential of the vessel at which the rate of corrosion of the vessel is at a minimum changes as the reaction of the reactants proceeds, and wherein the passive potential of the vessel at the beginning of the reaction is known, comprising:

an inert electrode supported in the solution;
a reference electrode electrochemically communicating with the solution;
control means connected to the reference electrode and the vessel for producing a control voltage;
said control means including a first adjustable means for bucking the difference in potential between the vessel and the reference electrode adapted to be set at the passive potential of the vessel at the beginning of the reaction, and a second adjustable means connected in series with the first adjustable means having a zero position wherein the voltage output of the first adjustable means is not changed, said second adjustable means being adapted to produce a control voltage alternately swinging above and below the voltage output of the first adjustable means;
a variable DC power supply connected to the inert electrode as the cathode and the vessel as the anode to be controlled by said control means to apply an increasing potential across the inert electrode and the vessel when the control voltage produced by the control means increases and to apply a decreasing potential across the inert electrode and the vessel when the control voltage decreases;
means for sensing the rate of current flow through the solution between the vessel and the inert electrode;
means for adjusting said second adjustable means to increase the control voltage above the voltage output of the first adjustable means until the current flow through the solution between the vessel and the inert electrode reaches a predetermined maximum, and, alternately, adjusting said second adjustable means to decrease the control voltage below the voltage output of the first adjustable means until the current flow through the solution between the vessel and the inert electrode again reaches said predetermined maximum;
means for comparing the degree of adjustment of said second adjustable means from its zero position which increases the control voltage with the degree of adjustment of said second adjustable means from its zero position which decreases the control voltage, and producing an output signal related to said comparison;
means responsive to said output signal for adjusting said first adjustable means, whereby the voltage set in said first adjustable means tracks the variations in the passive potential of the vessel as the reaction proceeds, and the potential of the vessel is retained in a range of minimum corrosion throughout the reaction.

6. A system for passivating a metallic process vessel containing a corrosive, electrolytic solution wherein the potential of the vessel at which the vessel has minimum corrosion changes with time, comprising:

an inert electrode supported in the solution;
a variable power source connected to the vessel as the anode and the inert electrode as the cathode for passing current through the solution between the vessel and the inert electrode and counteracting the corrosive action of the solution;
a reference electrode electrochemically communicating with the solution;
control means connected to the reference electrode, the vessel and the variable power source for monitoring the potential difference between the reference electrode and the vessel and controlling the voltage output of the variable power source in response to the difference in potential between the vessel and the reference electrode to control the flow of current through the solution between the vessel and the inert electrode and thus minimize the corrosive action of the corrosive solution, said control means including a potentiometer connected to buck the potential difference between the vessel and the reference electrode and provide no output from the control means to the variable power source when the potential difference between the vessel and the reference electrode is at a predetermined value;
swinging means connected to the control means for increasing and decreasing the voltage output of the variable power source above and below the value at which the minimum rate of corrosion of the vessel occurs;
a flip-flop circuit having first and second outputs;
current sensing means connected to the variable power source and the flip-flop circuit for changing the state of the flip-flop circuit each time the current passed through the solution between the vessel and the inert electrode reaches a predetermined maximum;
reversing means connected to the flip-flop circuit and the swinging means to reverse the direction of change of the voltage output of the variable power source each time the flip-flop circuit changes states and, thus, each time the flow of current through the solution between the vessel and the inert electrode reaches a predetermined maximum;
a secondary power supply;
two AND gates, each of said AND gates having two inputs;
means connecting the first output of the flip-flop circuit to one input of one of said AND gates and connecting the second output of the flip-flop circuit to one input of the other AND gate;
switch means for selectively connecting the secondary power supply to an input of each of the AND gates;
means connecting the swinging means to the switch means for connecting the secondary power supply to one of the AND gates when the voltage output of the variable power source is passing, in one direction, said value at which the rate of corrosion of the vessel is at a minimum, and for connecting the secondary power supply to the other AND gate when the voltage output of the variable power source is passing in the opposite direction, said value at which the rate of corrosion of the vessel is at a minimum;
a separate integrator connected to the output of each of the AND gates; and
means connecting the integrators to the potentiometer in the control means for changing the setting of said potentiometer upon changes in the relative values of the signals fed to said integrators each cycle of operation of said swinging means, whereby the bucking potential produced by said control means tracks changes in the potential difference between the vessel and the reference electrode at which the minimum rate of corrosion of the vessel occurs, and the vessel is retained in a potential range of minimum corrosion.

7. A system as defined in claim 6 wherein said control means comprises:
a first battery having its positive terminal connected to the reference electrode;
a first potentiometer connected across the terminals of the first battery;
a pair of second batteries connected in series;
a first potentiometer contactor engaging the first potentiometer and connected to the junction between the second batteries, said first potentiometer contactor being connected to said integrators for movement over the first potentiometer in response to the outputs of said integrators;
a second potentiometer connected across the terminals of the second batteries;
a second potentiometer contactor engaging the second potentiometer and being connected to said swinging means for movement over the second potentiometer in response to said swinging means;
an amplifier having two inputs;
means connecting one of the inputs of the amplifier to said second potentiometer contactor and the other input of the amplifier to the vessel; and
means connecting the output of said amplifier to the variable power source.

8. A system as defined in claim 7 wherein said swinging means comprises a servo motor having its shaft connected to said second potentiometer contactor.

9. A system as defined in claim 8 wherein said reversing means comprises:
a source of AC;
a reversing switch selectively connecting the source of AC to the servo motor for operating the servo motor in one direction when the switch is in one position and operating the servo motor in the opposite direction when the switch is in a reversed position; and
a relay connected to the reversing switch and to at least one of the outputs of the flip-flop circuit for reversing the direction of rotation of the servo motor each time the flip-flop circuit changes states.

10. A system as defined in claim 7 wherein said means connecting the integrators to the first potentiometer contactor in the control means comprises:
a differential amplifier having two inputs and two outputs;
means connecting one of the integrators to one of the inputs of the differential amplifier and the other integrator to the other input of the differential amplifier; and
a servo motor having its shaft connected to said first potentiometer contactor and having its control winding connected to the output of the differential amplifier to move said first potentiometer contactor in one direction when one of said integrators receives a larger signal than the other integrator, and to move said first potentiometer contactor in the opposite direction when the other integrator receives a larger signal than the first integrator.

11. A system as defined in claim 6 wherein said current sensing means comprises:
a resistor interposed in one output of the variable power supply; and
a trigger circuit having its inputs connected across the resistor and its outputs connected to said flip-flop circuit.

References Cited
UNITED STATES PATENTS

| | | | |
|---|---|---|---|
| 2,759,887 | 8/1956 | Miles | 204—196 |
| 3,067,123 | 12/1962 | Huber | 204—195 |
| 3,113,093 | 12/1963 | Hoberman | 204—196 |

OTHER REFERENCES

Sudbury et al.: "Corrosion," vol. 16, No. 2, February 1960, pp. 47t–54t.

HOWARD S. WILLIAMS, *Primary Examiner.*

T. TUNG, *Assistant Examiner.*